United States Patent
Cao et al.

(10) Patent No.: US 7,190,684 B2
(45) Date of Patent: *Mar. 13, 2007

(54) METHOD AND SYSTEM FOR UMTS PACKET TRANSMISSION SCHEDULING ON SHARED DOWNLINK CHANNELS

(75) Inventors: Qiang Cao, Swindon (GB); Stefan Gruhl, Nuremberg (DE); Jens Mueckenheim, Nuremberg (DE)

(73) Assignee: Lucent Technologies Inc., Murray Hill, NJ (US)

( * ) Notice: Subject to any disclaimer, the term of this patent is extended or adjusted under 35 U.S.C. 154(b) by 925 days.

This patent is subject to a terminal disclaimer.

(21) Appl. No.: 10/002,570

(22) Filed: Nov. 1, 2001

(65) Prior Publication Data
US 2002/0089952 A1  Jul. 11, 2002

(30) Foreign Application Priority Data
Nov. 22, 2000 (EP) .................. 00310343

(51) Int. Cl.
H04B 7/216 (2006.01)
H04L 12/28 (2006.01)
H04Q 7/24 (2006.01)
H04J 3/16 (2006.01)

(52) U.S. Cl. .................. 370/335; 370/230; 370/338; 370/465

(58) Field of Classification Search ............. 370/395.4, 370/349, 341, 332, 329, 335, 348, 342, 441, 370/395.42, 395.21, 466, 467, 468, 469, 370/476, 230, 338, 465
See application file for complete search history.

(56) References Cited

U.S. PATENT DOCUMENTS 6,236,656 B1 * 5/2001 Westerberg et al. ..... 370/395.4
6,567,387 B1 * 5/2003 Dulin et al. ................ 370/329
6,570,860 B2 * 5/2003 Hamalainen et al. ....... 370/329
6,714,551 B1 * 3/2004 Le-Ngoc .................... 370/401
6,747,962 B2 * 6/2004 Lintulampi et al. ........ 370/329
6,763,009 B1 * 7/2004 Bedekar et al. ............ 370/335
6,801,512 B1 * 10/2004 Cudak et al. ............... 370/332

(Continued)

FOREIGN PATENT DOCUMENTS

WO    WO 00 33589    6/2000

OTHER PUBLICATIONS

3rd Generation Partnership Project; Technical Specification Group Radio Access Network—Dec. 99, pp. 1, 15.

*Primary Examiner*—Ricky Q. Ngo
*Assistant Examiner*—Feben Micael Haile

(57) ABSTRACT

The invention relates to packet transmission scheduling and specifically to UMTS packet transmission scheduling.

It is an object of the invention to provide an improved method for packet transmission scheduling, especially on downlink shared channels and an improved packet transmission scheduling system, both the improved method and the system especially adapted to be used for UMTS systems.

The invention proposes a quality of service scheduling of multiple data flows in a CDMA system, wherein
a priority order of protocol data units (PDU) of multiple data flows with regard to predefined flow's quality of service requirements is determined and a serving of the protocol data units (PDU) is performed by dynamically creating transport block sets (TBS) to be transmitted to the physical layer (PHY-layer) with regard to the defined priority order and in dependence of allocated radio resource constraints.

23 Claims, 3 Drawing Sheets

U.S. PATENT DOCUMENTS

| | | |
|---|---|---|
| 6,901,065 B1 * | 5/2005 | Ehrstedt et al. ............. 370/341 |
| 6,950,420 B2 * | 9/2005 | Sarkkinen et al. .......... 370/338 |
| 2001/0040877 A1 * | 11/2001 | Love et al. ................. 370/329 |
| 2002/0181436 A1 * | 12/2002 | Mueckenheim et al. .... 370/349 |
| 2003/0133457 A1 * | 7/2003 | Ono et al. ................ 370/395.4 |
| 2004/0105402 A1 * | 6/2004 | Yi et al. .................... 370/312 |
| 2004/0160936 A1 * | 8/2004 | Liu et al. .................... 370/348 |
| 2005/0239491 A1 * | 10/2005 | Feder et al. ................ 455/522 |

* cited by examiner

METHOD AND SYSTEM FOR UMTS PACKET TRANSMISSION SCHEDULING ON SHARED DOWNLINK CHANNELS

CROSS REFERENCE TO RELATED APPLICATION

This application claims priority of European Application No. 00310343.9 filed on Nov. 22, 2000.

BACKGROUND OF THE INVENTION

1. Field of the Invention

The invention relates in general to a method for packet transmission scheduling and to a packet transmission scheduling system and specifically to a UMTS packet transmission scheduling method and to a System having UMTS packet transmission scheduling functionality.

2. Description of the Related Art

The invention addresses the problem of efficient scheduling of data flows, especially in Universal Mobile Telecommunication Systems (UMTS) for a transfer of data between a local base transceiver station (BTS) and e.g. a mobile station also termed user equipment (UE), i.e. for the UMTS Downlink Shared Channel (DSCH) between the base transceiver station and the mobile station. In the base transceiver station the radio access network has a complete or perfect knowledge of how much, when, and to whom packet transmissions are made or will have to be made within a certain interval of time. Hence, a central controlled unit may be and is used for the downlink data transmission.

However, in packet switching networks the task of multiplexing essentially reduces to the task of ordering packets and to then send them serially over a shared link. This process of serialization is referred to as scheduling. The benefit of packet switching is based on the multiplexing gain, where some data flows benefit from unused resources from other temporarily inactive data flows. The disadvantage of this service compared to a circuit switched service is a lack of predictability in such systems. Significantly, predictability of system behavior is one important measure of quality. Some services as e.g. internet communication or facsimile transmission services need stronger Quality of Service or "QoS" guarantees than others as for example pure speech data transmission. Quality of service (QoS) scheduling tries to balance the amount and timing of the received service for each flow according to the respective data flow requirements.

SUMMARY OF THE INVENTION

It is an object of the invention to provide an improved method for packet transmission scheduling, especially on downlink shared channels and an improved packet transmission scheduling system, both the improved method and the system especially adapted to be used for UMTS systems.

The inventive solution is characterized by a method, a system, a base and mobile station and an implementation software incorporating the features of claim 1, 15, 24, 25 and 26, respectively.

Accordingly, the invention proposes and uses a QoS-scheduling for handling multiple data flows in a Code Division Multiple Access (CDMA) system by dynamically scheduling protocol data units (PDU) in dependence of allocated radio resource constraints, especially ensuring the required data rates due to a rate conserving scheduling by simultaneously performing an optimization of the usage of radio resources.

The inventive QoS-scheduling preferably is apt to handle the data flows on downlink shared channels but can also be applied to scheduling of multiple data flows for different users on a dedicated channel in the downlink direction and for a single user in the uplink direction.

According to the preferred embodiments, the invention relies on two schedulers, which are linked together in a novel manner, whereby the first scheduler provides a certain degree of predictable behavior and the second scheduler provides Medium Access Control (MAC access) and also allows for bandwidth conserving segmentation and allocation strategies.

These two schedulers are named PDU scheduler and MAC scheduler. For the basics of this scheduling method reference is made to the co-pending application filed with the same Patent Office, Stefan Gruhl: "Method of linking two schedulers of a multi-layer network and a network comprising a transceiver having linking functionality for two schedulers", the contents of which is incorporated by reference hereby. In the present application proposal the scheduling method of the above-cited co-pending application has been adapted to the UMTS mobile communication system. It is especially shown how to link the two schedulers and parameterize the local algorithms for UMTS, especially for the medium access control (MAC) scheduler.

BRIEF DESCRIPTION OF THE DRAWINGS

The invention is described in view of preferred embodiments in more detail below and reference is made to the accompanying drawings.

DETAILED DESCRIPTION

Figure 1:
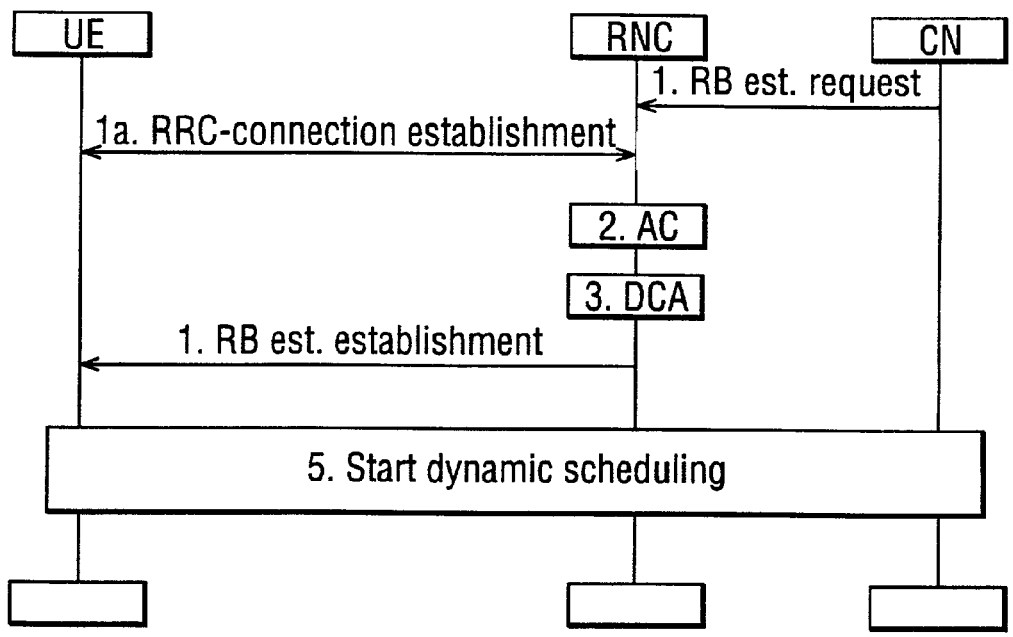
FIG. 1: shows a message flow for adding a radio bearer or user equipment (UE) to the scheduler.

For a better understanding of the invention and especially to ensure the improved performance of the inventive method and devices, certain requirements should be met and a number of assumptions are made in advance.

Assumptions and Requirements

A certain amount $P_{PS}=\alpha_{PS} \cdot P_{max}$ of the overall maximum transmission power $P_{max}$ is allocated by the radio resource management unit (RRM) to the packet switched radio bearer. The scheduler is apt to use $P_{PS}$ essentially autonomously without invocation of the radio resource management unit (RRM).

If automatic repeat request (ARQ) is applied, the number of retransmissions is assumed to be significantly smaller than the regular traffic.

All transmissions having certain assigned quality requirements are embedded into a data flow. Accordingly, a data flow is defined as a sequence of data packets from the same source to the same destination in the network, for which the user has certain QoS requirements.

Each radio bearer is related to a single data flow. Because multiple radio bearers might be established for a single user, multiple data flows could exist simultaneously that are related to a single user, too. In the following description all data flows are handled separately.

Throughout this description the elements of a data flow are defined as Protocol Data Units (PDU or PDUs).

These PDU are typically layer 3 elements from an UMTS point of view, but the invention is not necessarily limited to this.

Protocol data units (PDUs) are segmented into transport blocks (TB or TBs), which receive their own headers, as specified in the UMTS 3GPP standards. This operation is associated with layer-2. Typically but not necessarily the transport blocks have a fixed size. An arbitrary number of transport blocks can be put together to one Transport Block Set (TBS). Typically but not necessarily only transport blocks of one protocol data unit (PDU) are put together.

One TBS is scheduled by the medium access control layer within the scheduling interval (typically 10 ms) to the physical layer (PHY-layer) per flow.

For the downlink shared channel there is no soft handover (HO) assumed. Therefore, the scheduler handles the data flows addressed to UEs of the own cell, only.

Any mobility related procedures, e.g. hard handover are handled by the radio resource management system (RRM) independently.

The Bit Error Rate (BER) of a data flow is a static QoS requirement of the associated radio bearer. Depending on the delay constraints, there is a trade-off between Forward Error Correction (FEC), i.e. the received signal energy to noise ratio $E_B/N_0$ vs. automatic repeat request (ARQ) methods, i.e. the allowed number of retransmissions.

It is assumed that the required bit error rate always can be received from the core network or radio access network.

In order to optimize the bandwidth consumption of a data flow padding is minimized as a trade-off for delay where possible. This is indicated by the flow's QoS constraints and the recent flow status.

In order to optimize the delay, the whole protocol data unit (PDU) is taken by the PDU scheduler preferably at once.

The downlink shared channel preferably is time synchronized, i.e. every data flow starts its transmission at the same point of time. Discontinuous transmission (DTX) on the downlink shared channel could lead to large fluctuations in interference to users on other dedicated channels (DCH) of the same cell or to all users of the adjacent cells. Hence, a discontinuous transmission (DTX) should not be used in downlink shared channels.

According to recent 3GPP standards there is no physical multiplexing (or PHY MuX) for different data flows in the downlink shared channel. As a consequence thereof, the transport format combination sets (TFCS) on the downlink shared channel consists of a transport format set (TFS) for one data flow, only. The transport format set is associated to the data rates $R_B$ of the respective data flow. The transport format sets are directly related to the spreading factor SF of the Code Division Multiple Access (CDMA) transmission system which is used to support that data rate.

The transport block size within one scheduling interval remains constant for each protocol data unit (PDU). Consequently, only the number of transport blocks needs to be counted for medium access control (MAC) scheduling.

Radio Resource Allocation (RRA)

Basics on Radio Resource Allocation for a Downlink Shared Channel

Due to its nature and in view of using a Code Division Multiple Access (CDMA) method, the main resource in the UMTS mobile communication system is the transmission power, which has to be spent for a certain user. The transmission power $P_{tri}$ of data flow #i is expressed as $$P_{tri} \approx \left(\frac{E_B}{N_0}\right)_i \cdot \frac{R_{Bi}}{W} \cdot \frac{I_{0i}}{h_i} = R_{Bi} \cdot C_i \qquad \text{equation 1}$$

where $(E_B/N_0)_i$ denotes the to be received signal energy to noise is ratio for data flow #i, $R_{Bi}$ denotes the current data rate used by flow #i, W is the chip rate which chip rate at the moment is defined for UMTS as W=3.84 MChip/s, $I_{oi}$ denotes the interference at the user equipment (UE) where the downlink data flow is addressed to, $h_i$ is the path-loss between the user equipment (UE) and Node B.

Resources in CDMA systems depend not only on the data rate as handled by conventional scheduling methods or prior art schedulers but also on a factor C which depends on several other parameters, like path-losses and interference. From equation 1 $C_i$ is given as $$C_i = \left(\frac{E_B}{N_0}\right)_i \cdot \frac{1}{W} \cdot \frac{I_{0i}}{h_i} \qquad \text{equation 2}$$

The $C_i$-value is an essential part of the scheduling algorithm. Depending on the time when it is used, this value preferably is calculated in two ways:

At or during the establishment of the data flow equation 2 may be used directly, where $(E_B/N_0)_i$ is initially determined from the bit error (BER) requirement of the respective radio bearer and $(I_{oi}/h_i)$ is estimated from a measurement that is signaled from the user equipment (UE) to the network.

After a communication channel is established with the radio bearer, there are no regular measurements of $(I_{oi}/h_i)$ available in the network. Additionally, $(E_B/N_0)_i$ may differ from the initial value, e.g. due to a varying environment. Then, equation 2 should not used then, i.e. after establishing of the communication channel. At this moment equation 1 is used with $$C_i = P_{tri}^{prev} / R_{Bi}^{prev}, \qquad \text{equation 3}$$

where $P_{tri}^{prev}$ and $R_{Bi}^{prev}$ are the previous transmission power and previous data rate of data flow #i, respectively.

The overall transmission power $\Sigma_{i \in active} P_{tri}$ of all active data flows on the downlink shared channel is limited by the allocated transmission power $P_{PS}$ for the packet switched users. Therefore, the overall transmission limit for all active data flows is $$\sum_{i \in active} P_{tri} = \sum_{i \in active} R_{Bi} \cdot C_i \le P_{PS}. \qquad \text{equation 4}$$

Due to limited capabilities of e.g. a single channel transmission unit there is a restriction of the transmission power of a single data flow $P_{max}^{single}$, too. Consequently, in addition to equation 4 the following limit is given for all active data flows $$P_{tri} = R_{Bi} \cdot C_i \le P_{max}^{single}, \forall\ i \in active. \qquad \text{equation 5}$$

Tasks and Functions of the Improved Radio Resource Allocation (RRA)

FIG. 1 shows a message flow between a Core Network (CN), a Radio Network Controller (RNC) and User Equipment (UE) when a new radio bearer is added to the scheduling function.

Although it is an essential part of a UMTS mobile communication system, the base transceiver station (BTS) is not separately shown as these stations are well known to persons skilled in the art. The following tasks and functions should be performed by the radio resource allocation units (RRA) before the scheduling function or operation starts:

1. Radio Bearer Establishment Request

During this phase a new radio bearer establishment is requested from the Core Network. This request must contain or specify the quality of service (QoS) requirements of the associated data flow, i.e. the requested bit error rates (BER), data rates to be transmitted and delay requirements. If there is no radio resource control (RRC) connection established, a radio resource control connection establishment procedure between the radio network controller (RNC) and the user equipment (UE) has to be performed which is shown as step 1a in FIG. 1.

2. Admission Control (AC)

The purpose of admission control is to decide whether this new request can be admitted or not. For admission control several parameters like the requested quality (QoS) of the service and the current network load are used. Other reasons for not admitting the request might be that no radio resources are available which is checked by the next step. If the request is denied there might be a negotiation procedure with a lower quality of service QoS.

3. Dynamic Channel Allocation

The Dynamic Channel Allocation (DCA) procedure allocates the following transmission parameters to the data flow (non exclusive): Transport format set (TFS), radio link control (RLC) Info, new Channelisation Code, Initial transmission power etc. For the allocation method for transport format set and channelisation code see also paragraph "Allocation of Data Rates" of this description. A new amount of transmission power $P_{packet}$ for the scheduler can also be allocated by DCA.

4. Radio Bearer Setup

This function performs a setup of the Radio Bearer and synchronization between RNC and UE. Additionally, the BTS will be initialized with the parameters that are allocated by DCA which is not shown in FIG. 1 but known to a person skilled in the art.

5. Start Dynamic Scheduling

After a successful establishment and initialization the new data flow is added to the scheduling function. The scheduling function will be performed now also for this flow. Reference is made to FIG. 1 showing the message flow for adding a radio bearer to the scheduler.

Allocation of Data Rates, TFS and Channelisation Codes

Allocation of Data Rates

The allocation of the data rates for each data flow has a strong impact on the system efficiency that the scheduler can achieve. The data rates relate to TFS and the channelisation codes. According to the recent 3GPP standards there is no physical multiplexing (or PHY MuX) for different data flows in the downlink shared channel. As a consequence thereof, the transport format combination sets (TFCS) on the downlink shared channel consists of a transport format set (TFS) for one data flow, only. The transport format set is associated to the data rates $R_B$ of the respective data flow. The transport format sets are directly related to the spreading factor SF of the Code Division Multiple Access (CDMA) transmission system which is used to support that data rate. For a rough allocation or estimation of the limit data rates the following rules are applied:

For the maximum data rate $R_{Bmax}$ transport format sets (TFS) should be allocated to allow data rates up to two to four times of the maximum data rate, i.e. (2 to 4)$R_{Bmax}$. There are two reasons for this requirement. The first is that these maximum transport format sets are required from the MAC-scheduler to serve a flow with a temporarily higher data rate than requested to let a flow profit from other flows being idle. This applies when there is remaining capacity on the air-link and if this flow has already sent packets to the PDU list ahead of its specified rate.

The second reason is to allow for a time divisional multiplex style multiplexing on the transport block level.

The MAC-scheduler's algorithm can be developed towards bandwidth efficiency. Therefore it also may be desirable to use arbitrary sizes of transport blocks to minimise padding. This means the available transport format should be able to temporarily exceed specified rates.

Fairness, bandwidth and quality of service (BW-QoS) guarantees among flows are maintained by another scheduler, the PDU scheduler.

For the minimum data rates $R_{Bmin}$ transport format sets should be allocated to allow data rates below $R_{Bmin}$. The availability of smaller transport format sets allows the MAC-scheduler to minimise padding. As this introduces additional delay and lowers the average transmission rate, it is only applicable to certain QoS flows. The optimization of such allocation and TFC usage is addressed separately.

In order to comply with the assumption that the downlink shared channel preferably is time synchronized, i.e. every data flow starts its transmission at the same point of time, and discontinuous transmission (DTX) on the downlink shared channel could lead to large fluctuations in interference to users on other dedicated channels (DCH) of the same cell or to all users of the adjacent cells, only those transport format sets are allowed which would fill up the whole data frame with data. Because the spreading factors of the channelisation codes are in the order of $SF=2^k$, $k=2$, 3, . . . , according to the aforementioned recent 3GPP standards, this leads to data rates of $R_B=R'_B \cdot 2^n$, $n=0$, 1, . . . , where $R'_B$ represents a reference data rate for a certain given spreading factor and may become $R_{Bmin}$.

Transport Format Set (TFS)

The transport format set is defined as the set of transport formats that are associated to one data flow. The semi-static part (coding, transmission interval, rate matching) essentially determines the bit error rate. It is defined by the radio resource management. In the following discussion, the focus is only on the dynamic part which consists of the transport block size and the transport block set size. The dynamic part of transport format sets can be used for optimization of the segmentation in the RLC. For the choice of this dynamic part there is a trade-off between the granularity of the data rates and the limited size of transport format sets. On the one hand, each data flow intends to have a high granularity in data rates avoiding extensive padding. This would lead to a large transport format set size. On the other hand, a transport format set is used to enable efficient physical or PHY signaling for changing data rates. Due to limitations of that PHY signaling (e.g. TFCI (Transport Format Combination Indicator) encoding) the maximum transport format set size is quite limited. Therefore the following transport format set allocation rules regarding the characteristic of the data flow are proposed and used according to the invention:

1. Real Time (RT) Services: This service type needs immediately serving of the offered data. Hence, a high granularity towards higher data rates is desired. Therefore, for real time services a larger transport format set should be allocated.
2. Non Real Time (NRT) Delay Sensitive Services: Here, a limited automatic repeat request (ARQ) can be used for protection of the data flow. The granularity is not as high as for the pure RT service because some data can be queued for a limited time. Therefore a limited transport format set can be allocated for such services. For efficient use of automatic repeat request mechanisms the transport block size should be small.
3. NRT Unconstrained Delay Services: This type of service is the best candidate for bandwidth optimization. In principle unlimited queuing is possible. Hence, no much granularity is necessary. Therefore a quite limited transport format set can be allocated for this service type. Granularity is used to avoid padding, only.

Beyond the delay constraint it is sensible to take further QoS requirements and flow specifications into account. The system could potentially adopt to certain preferred PDU sizes, like that of a transport control protocol acknowledgement (TCP-ACK). Bulk data transfer could guard the selection towards max. PDU size, etc.

DL Channelisation Codes

For allocation of downlink (DL) channelisation codes the method of Code Branch Allocation (CBA) as described in Qiang Cao, Seau Lim, Jens Mueckenheim: "Code branch allocation for CDMA systems," Patent Appl. EP 99 301 810.0, filed Oct. 3, 1999 is used. The CBA method is an attempt to solve the code space shortage problem, which is especially relevant in the downlink. CBA defines a path in the code tree, the code branch, which consists of spreading codes for each SF that can be used for the transmission. The code branch might be transmitted to the UE. There can be intersections of code branches where only exclusive use of one code branch simultaneously is allowed. Because there is a fixed relation between data rate and spreading factor (SF), see also the above paragraph assumptions and requirements, an allocation rule of the path in the code tree is used in view of recent 3GPP standards. According to recent 3GPP standards there is no physical multiplexing (or PHY MuX) for different data flows in the downlink shared channel. As a consequence thereof, the transport format combination sets (TFCS) on the downlink shared channel consists of a transport format set (TFS) for one data flow, only. The transport format set is associated to the data rates $R_B$ of the respective data flow. The transport format sets are directly related to the spreading factor SF of the Code Division Multiple Access (CDMA) transmission system which is used to support that data rate. The following allocation rule is used according to the invention:

1. For data rates below the maximum requested one the nodes of the code branch should be allocated always below intersection points. This allows guaranteed data rates $R_{Bmax}$ for all data flows, if no padding-reduction strategy is used in the MAC-scheduler. For flows that have stringent BW-QoS requirements and where still padding-reduction is desirable, CBA should only be made with unconstrained flows.
2. For TFC for higher data rates of 2 to 4 times. $R_{Bmax}$ that can be used for the proactive scheduling (cf. data rate allocation rule 11) nodes in the code tree can be used that are above intersection points. Because only a quite limited number of data flows is allowed to use this larger data rates no conflicts in the channelisation code usage are expected.

Figure 2:
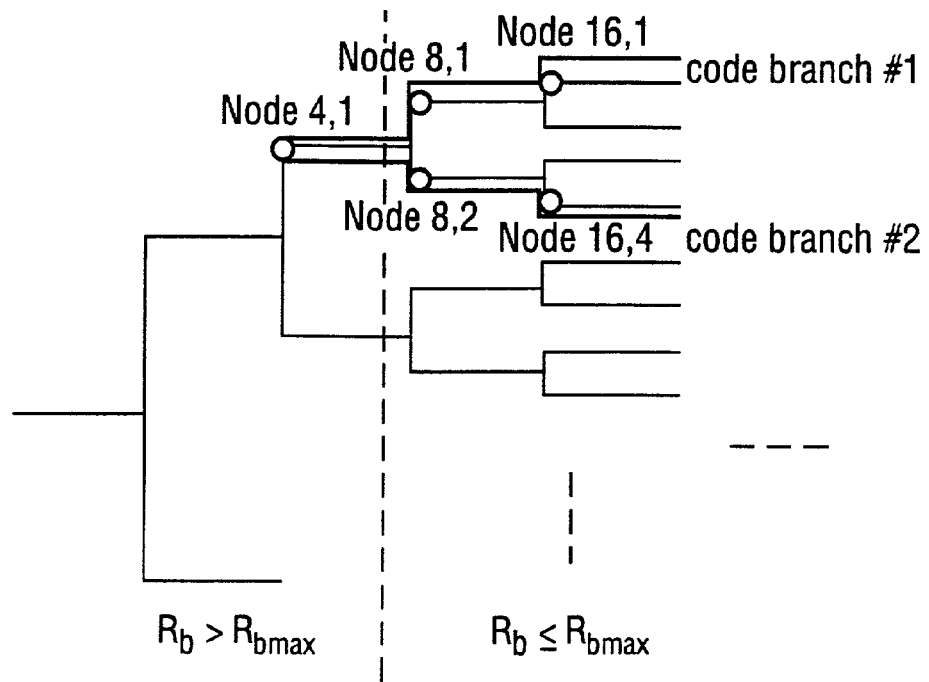
FIG. 2: shows the allocation of channelisation codes using the code branch allocation (CBA) method in view of a preferred embodiment.

In the following usage of the CBA method for allocation of channelisation codes for the scheduling on downlink shared channel is explained by means of an example. FIG. 2 illustrates a code tree, which is a representation of the orthogonal variable spreading factor codes that are used on the UMTS downlink shared channel. Every node characterizes a code sequence with a spreading factor given by the first number. All codes within the code tree cannot be used simultaneously. A node can be used for a physical channel if and only if no other node on the path from the specific node to the root of the tree (i.e. with lower SF) or in the sub tree below the specific node (i.e. with higher SF) is used by another physical channel. In the example it is assumed that the sub tree below node 4,1 is reserved for downlink shared channel usage. The assignment of the nodes for the code branches to two users can be as follows:

Because the nodes below node 8,1 and 8,2 can be used simultaneously, these sub trees can be-assigned for the data rates below $R_{Bmax}$. For example, user #1 gets the nodes 8,1 and 16,1. User two will be assigned to nodes 8,2 and 16,4.

For the proactive scheduling purpose node 4,1 is allocated to both, user #1 and user #2. They cannot be used simultaneously. Hence, the scheduler must ensure that when user #1 takes node 4,1 user #2 should not transmit on any node of its code branch and vice versa.

Hence, the code branch for user #1 is: (4,1); (8,1); (16,1) and for user #2: (4,1); (8,2); (16,4), see also FIG. 2.

The Scheduling Method

The invention contemplates using of two schedulers, which are linked together in a novel manner to achieve a certain degree of predictable behavior, while also allowing for bandwidth conserving segmentation and scheduling, see also Stefan Gruhl in "Method of linking two schedulers of a multi-layer network and a network comprising a transceiver having linking functionality for two schedulers". These two schedulers are named PDU scheduler and MAC-scheduler.

The first one operates on the input data from Layer 3, the Protocol Data Units (PDU). It receives the QoS requirements of each flows and determines the order in which PDUs should receive service. This service is delivered by lower layer protocol functionality and incorporates mainly two steps. The first is Layer-2 protocol related and includes mainly segmentation of PDU to Transport Blocks (TB) and Automatic Repeat Request (ARQ).

The MAC-scheduler serves the PDU's from this list and tries to reflect the order in the list, while also taking CBA-, timing and power constraints into account.

Figure 3:
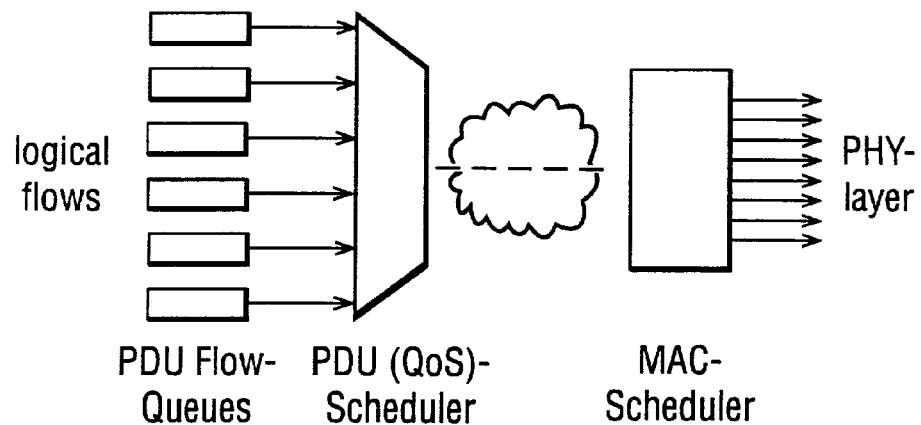
FIG. 3: shows principles of the quality of service (QoS) scheduling method.

In FIG. 3 the principle architecture of the two serial schedulers is shown. The MAC-scheduler is active at every frame, e.g. on a 10 ms base. The PDU scheduler is operated on all active flows, i.e. with a non-empty PDU flow-queue. Systems of serially uncoupled schedulers can show undesirable behavior. Therefore, both schedulers are linked together.

To allow for the linking the intermediate protocol functionality (depicted as cloud in FIG. 3) has to allow for a certain implementation summarized below. It is assumed that layer-2 protocol functionality is apt to be processed as a stateless operation with the character of a function with negligible processing time. Two main tasks in layer-2 are identified which are for the sender, the segmentation process to transport blocks TBs and an ARQ stage for transport blocks TBs. The segmentation process is intuitively a stateless function as it turns one input element in an output vector of new elements (typically with new headers for sequence numbers, etc . . . ). Automatic repeat request ARQ is processed as a function with the input of a TB and the output of the same TB, with ARQ parameters set. Besides this output there is potentially other asynchronous output of the ARQ stage:

a) If the ARQ window size is reached, no output is generated until former transmissions were successfully acknowledged by the receiver. This case can be neglected if always a test on the available window size is done before performing the ARQ operation.

b) When the automatic repeat request (ARQ) stage receives the request for a retransmission, it generates an output without input.

The number of retransmissions is assumed to be significantly smaller than the regular traffic and therefore treat this relatively rare case as a separate ARQ-process which generates its own traffic regardless of the traffic which is mainly running through the ARQ stage in the describe function manner.

c) If the maximum number of retransmissions is exceeded and the ARQ considers a PDU transmission unsuccessful, there is another asynchronous signal that has to be signaled to upper layers.

The central idea to allow for such linking of the two schedulers is that the MAC-scheduler operates on PDU's in the Protocol Data Unit (PDU) list, while this list is dynamically changed by the Protocol Data Unit (PDU) scheduler. As a consequence, the whole PDU access has to take place via reference to allow for protocol operation on demand techniques. This has to be accompanied by locking of the shared element, the PDU list.

The exact linking method and further details are subject of the above-cited application from Stefan Gruhl: "Method of linking two schedulers of a multi-layer network and a network comprising a transceiver having linking functionality for two schedulers".

PDU Scheduler

The PDU scheduler takes the PDU from the incoming data flows. Each data flow is queued in its own FIFO-queue, denoted as PDU flow-queue. They are scheduled regarding their QoS requirements into one common list for the MAC-scheduler. This list is denoted as PDU list. This list is not termed a queue, because due to MAC-constraints it cannot be assured to serve this queue in a FIFO fashion. The PDU scheduler must be able to serve the data with the required data rates. For this purpose any rate conserving scheduling policy can be applied, see Hui Zhang, "Service Disciplines for guaranteed Performance Service in Packet-Switching Networks," Proceedings of the IEEE, Vol. 83, No. 10. October 1995, e.g. Weighted Fair Queuing ($WF^2Q$) or Virtual Clock Queuing (VCQ).

The scheduling elements for this scheduler are taken depending on the following rule: Regularly the PDU's are large enough to be scheduled as one unit. In this case one scheduling element equals one PDU.

If it is possible to serve several PDU's simultaneously on the MAC-layer it may become desirable to have several PDU's available for MAC-scheduling from one flow. This would mainly be the case where PDU's become too small to be served with the required minimum data rate $R_{Bmin}$ within the given MAC-scheduling interval $T_{schedule}$ (typically $T_{shedule}$=10 ms), i.e. when $$PDU_{len}/R_{Bmin} \leq T_{schedule} \qquad \text{equation 6}$$

The problem can be overcome by having several PDU's from the flow grouped together into one container, which then becomes the scheduling element.

Hence, the scheduling element can be defined as one container that may consist of one (normally) or several PDU's. Throughout this document one scheduling element is defined as PDU and the term PDU scheduler is used for the sake of simplicity.

As shown in J. Cobb, M. Gouda and A-EI-Nahas, "Flow timestamps," Annual Joint Conference of Information Sciences, 1995, it is also reasonable to work with flow time-stamps instead of PDU time-stamps. When doing so, the inventive PDU scheduler becomes active when a PDU from a flow is fully served and therefore removed from the PDU list or when a formerly inactive flow gets reactivated by a PDU arrival into its empty PDU flow-queue. This is beneficial as it limits the number of elements in our PDU list to the number of active flows.

MAC-Scheduler

Main Function of the MAC Scheduler

The MAC-scheduler serves the PDU's from the PDU scheduler. The order in the PDU scheduler's list signals the priority in which the PDU scheduler wants the PDU's to be served. The MAC scheduler tries to achieve this while obeying three restrictions:

Bandwidth constraint due to TFC allocation of the flow and availability of a node in the code tree (refers to CBA)

Delay constraints:

Drives the decision how many subsequent TBS transmissions spread over several timing intervals are tolerable to obey timing requirements of the served PDU ARQ-constraints:

Transmission of TB's that receive ARQ service is only possible until the ARQ window size is reached. Further transmissions are possible only after the ARQ stage receives the acknowledgement from the receiver.

Power constraints:

Both the power for the transmission to one individual mobile and the overall power in the cell is limited. To avoid RRM regulation on these issues, the scheduler should itself take this into account.

This present proposal mainly consists of a framework that allows for several MAC-scheduling algorithms to obey these constraints without having to explicitly worry for the flow's QoS requirements anymore, as this has been applied by the PDU scheduler already.

In the following an algorithm is used complying with these constraints in a straightforward manner. Later some improvements are shown.

Figure 4:
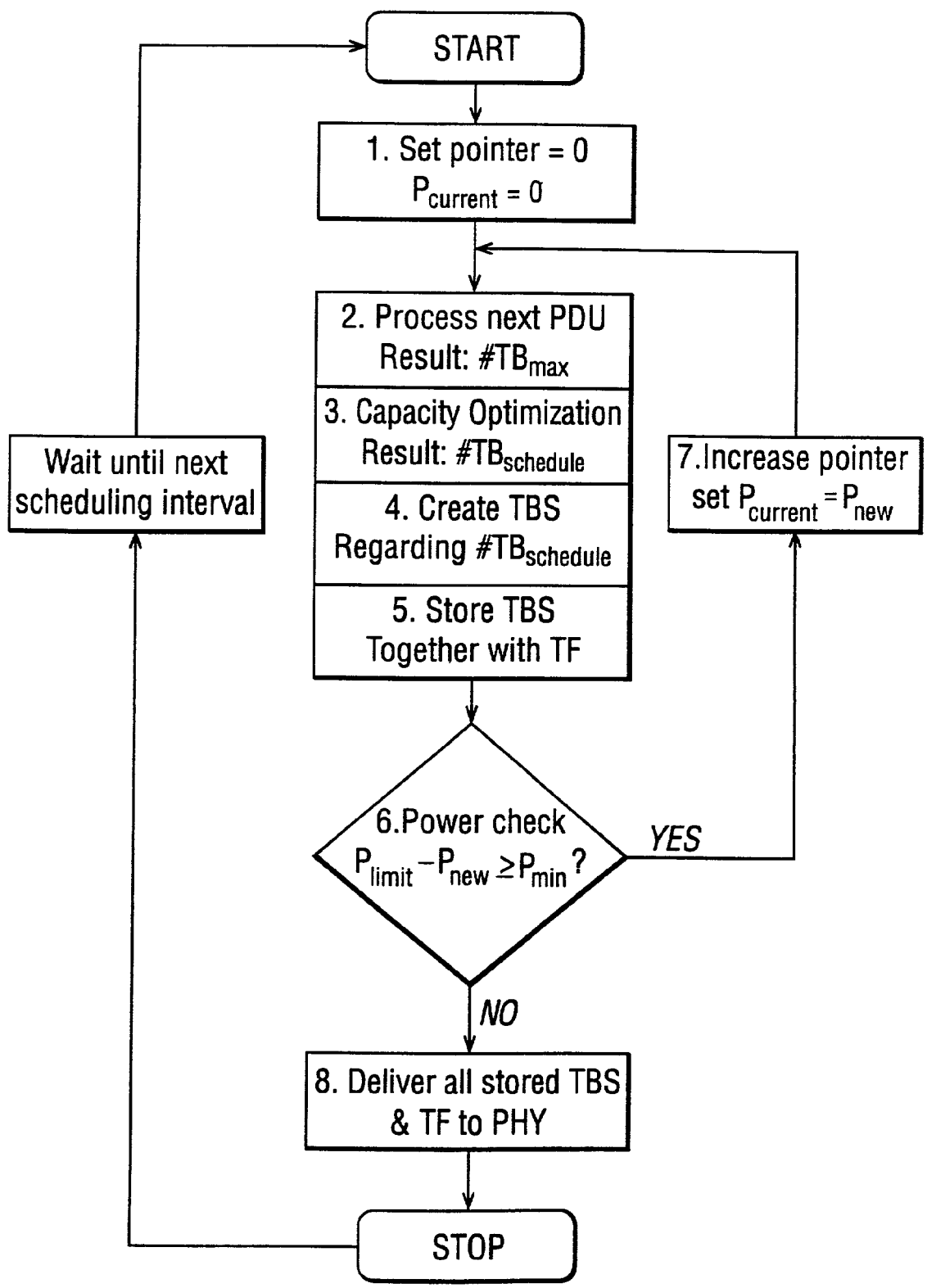
FIG. 4: shows an improved medium access control (MAC) scheduling mechanism.

The basic mechanism for MAC scheduling is depicted in FIG. 4.

It essentially is the following:
1. Set the queuing pointer in front of the PDU list, i.e. set pointer=0. Reset the total consumed power $P_{current}$=0.
2. Take the next PDU from the PDU list and consider as much of it in means of TB for scheduling as it is constrained by:
   PDU_size/segment size→result max #1 of TB's
   ARQ-constraint→result max #2 of TB's
   TFC-constrain→result max #3 of TB's
   Maximum single transmission power $P_{max}$(single): $R_{Bi}$(max)=$P_{max}$(single)/$C_i$(cf. equation 5), where $C_i$ is currently given by equation 2 or equation 3→result max #4 of TB's
   Overall power limit $P_{limit}$: Calculate the virtual available data rate
   $R_{Bi}$(available)=($P_{limit}$-$P_{current}$)/$C_i$ (cf. equation 4)→result max #5 of TB's
   Formal: Result #$TB_{max}$=min (max #1 of TB's ... max #5 of TB's);
3. Perform capacity optimizing decisions on TBS creation. It can be advisable to schedule less TB's, with a smaller TBS than possible from the constraints in step 2. If no optimization is desired, chose max #of TB's from step 2. →new variable #$Tb_{schedule}$
4. Create #$TB_{schedule}$ TB's. Therefore the segmentation and ARQ on demand is "executed" on them. The such created TB's are assembled to a TBS. Set $R_{Bi}$(used) regarding the created #$TB_{schedule}$.
5. Take the TBS and store them together with the associated TF for delivering to PHY-layer in step 8.
6. Compute the total cell power by $P_{new}$=$P_{current}$+$C_i$·$R_{Bi}$(used). Compare this value against a power limit $P_{limit}$.
7. If total Power check is ok, i.e. if $P_{limit}$-$P_{new}$≧$P_{min}$ ($P_{min}$: minimum transmission power for a certain # of TB's) and there are more PDU's in the PDU list, increase $P_{cell}$ by one to the next PDU in the PDU list, set $P_{current}$=$P_{new}$ and go to step 2.
8. Deliver all stored TBS together with their associated TF to PHY layer.

Handling of the Power Limit $P_{limit}$

This section describes how the power limit $P_{limit}$ for the cell is allocated for MAC-scheduling. The power limit $P_{limit}$ for the scheduler should be chosen according the following rule:

$$P_{limit}=\min\{P_{PS}, P_{current}(t-1)+\Delta P_{inc}\} \quad \text{equation 7}$$

The first term in equation 7 prevents the scheduler to use resources larger than the by RRM assigned $P_{PS}$. The second term guarantees that the increase in the current transmission power $P_{current}$ is below a given limit $\Delta P_{inc}$. This limitation is useful in order that the DL power control for all users on other TrCH which are not handled by the scheduler (e.g. users on DCH and of the adjacent cell) can follow the increase of transmission power on downlink shared channel. The overall downlink shared channel transmission power from the previous time $P_{current}(t-1)$, which is estimated by the sum of the transmission powers $P_{tri}^{prev}$ of all previous active data flows #i $$P_{current}(t-1) = \sum_{i \in prev\ active} P_{tri}^{prev} \quad \text{equation 8}$$

$P_{tri}^{prev}$ (also used in equation 3) is simply the transmission power of the code is sequence that was associated to data flow #i (Code Tx power). It can be measured in time periods of some scheduling intervals (up to 100 msec) which is much faster than the overall transmission power measurement (up to 1sec) that is used by RRM.

The basic limit definition in equation 7 can be enhanced as described in the following. For the purpose of efficient handling of the allocated radio resources the MAC Scheduler should monitor the goodput, i.e. the throughput $R_{actual}$ of the scheduler without retransmissions, which simply is defined by $$R_{actual} = \sum_{i \in active} R_{Bi} \quad \text{equation 9}$$

The virtual bandwidth is defined by the overall available data rate $R_{overall}$, which can be allocated by the MAC Scheduler. This virtual bandwidth depends on the allocated transmission power $P_{PS}$ for the scheduler:

$$R_{overall}=\text{function}(P_{PS})\approx P_{PS}/C' \quad \text{equation 10}$$

The value of C' represents a kind of estimate from the constants $C_i$ from all data flows. The goodput $R_{actual}$ is now compared with the virtual bandwidth $R_{overall}$. Depending on the comparison result the following actions can be taken:

If $R_{actual}$<$R_{overall}$, then there is a scheduling problem. The scheduler can process less data than required. In this case RRM has to be informed to take actions. This could involve to allocate larger resource $P_{PS}$ to the scheduler if available. If not, a dynamical resource reallocation to flows has to be performed. This could for example mean to drop or stop certain flows, that formerly were served with QoS BW guarantee. Finally this feedback can be used to alter capacity estimates for future Admission Control decisions.

If $R_{actual}\approx R_{overall}$, then the scheduler works efficient and within the limits. In this case equation 7 will be used as scheduling policy.

If $R_{actual}$>>$R_{overall}$, then the scheduler works in a relaxed manner. That means it is able to schedule much more data than actual required. In this case the scheduler can have a self limiting behaviour depending on the history of the goodput $R_{actual}$ in the following way:

if $R_{actual}(t)\leq R_{actual}(t-1)$, then use the following modification of equation 7:

$$P_{limit}=P_{current}(t-1)-\Delta P_{dec} \quad \text{equation 11}$$

where $\Delta P_{dec}$ is a certain decrease of transmission power.

if $R_{actual}(t)$>$R_{actual}(t-1)$, then use equation 7 as it is.

This allows equalisation of the total traffic in terms of traffic shaping. In order to keep the allocated resources available for the scheduling process RRM will not be informed about this self limiting. Nonetheless there will be a noticeable lower variation of power consumption on downlink shared channel which is beneficial for neighbouring cells and DCH power control fluctuation in this cell.

Figure 5:
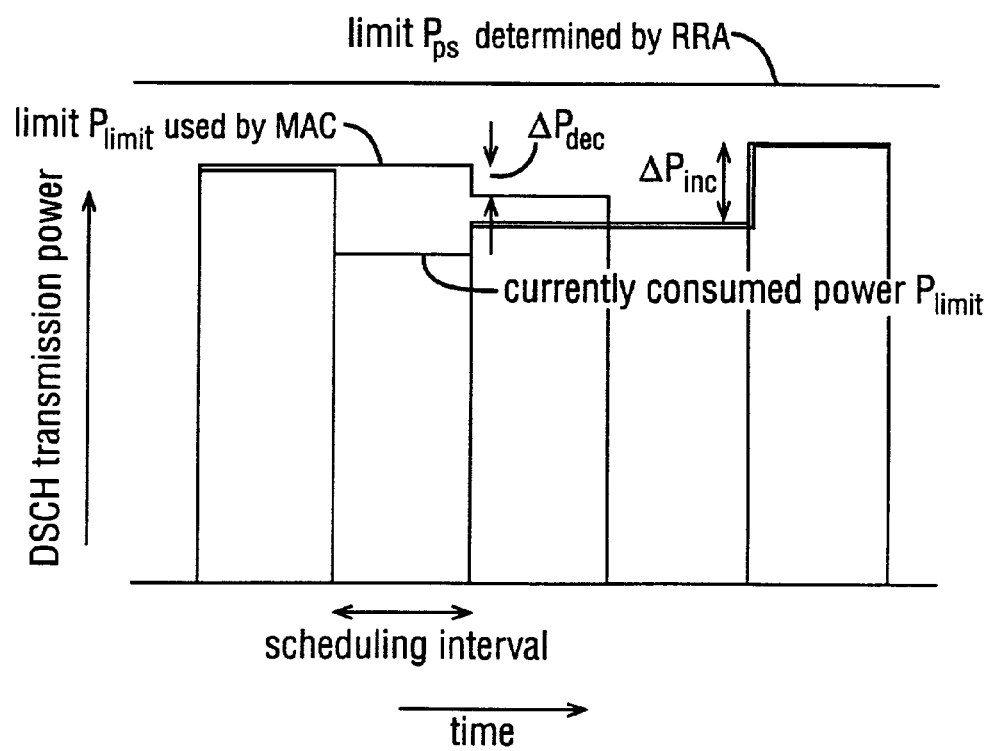
FIG. 5: shows how to process power limits within an improved medium access (MAC) scheduler based on a preferred embodiment.

FIG. 5 illustrates an example of handling $P_{limit}$. Both, the usage of the increasing limit $\Delta P_{inc}$, when more power is required, and the usage of the decreasing limit $\Delta P_{dec}$ for less required Tx power are shown.

Improvement of MAC-scheduling Decision

Especially for NRT services it is not necessary to always attempt to pack the whole PDU into one TBS to be scheduled in one MAC-scheduling interval. It might be desirable to spread the transmission in time over several scheduling intervals. Hence, the invention proposes and uses the following enhancement to section main function:

Main Function

For NRT-services for each PDU the maximum number $N_{schedule}$ of MAC-scheduling intervals $T_{schedule}$ that are allowed for an initial PDU transmission is determined. "Initial" means that this value does not include potential retransmissions. The value $N_{schedule}$ is determined by:

$$N_{schedule} = PDU_{len}/(R_{Bmin} \cdot T_{schedule})  \qquad \text{equation 12}$$

Here, a system is assumed that obeys no other restrictions (e.g. ARQ . . . , see assumption mentioned above that if automatic repeat request (ARQ) is applied, the number of retransmissions is assumed to be significantly smaller than the regular traffic). Given this value for each PDU, the MAC scheduler can schedule less TB at a time to reduce the padding. This is possible because the remaining data are apt to fit into a smaller TBS in the next interval.

Conclusion

The invention is not restricted to the specific embodiments described above. A person skilled in the art will recognize that based on a rate conserving strategy the scheduler guarantees the required data rates.

Even if a delay is not explicitly addressed by the scheduling principle, if the respective data flow is in compliance with its required quality of service the scheduler guarantees that there will be no additional delay due to congestion within the scheduling system.

Preferably, bit error rate (BER) requirements are guaranteed in addition via properly forward error correction (FEC) and automatic repeat request (ARQ) functions.

A most preferred application of the improved scheduler is a handling of data flows in the downlink shared channel and the downlink shared channel scheduling was described in detail in the above description. However, the inventive method of QoS scheduling is not limited to downlink shared channels. It also may be applied to scheduling of multiple data flows for different users on dedicated channels (DCHs) in the downlink (DL) and for a single user in the uplink (UL).

The invention claimed is:

1. Method of scheduling multiple data flows for quality of service adjustment in a CDMA system, especially in a mobile telecommunication system, comprising the steps of:
   receiving quality of service requirements of each data flow comprising protocol data units (PDU),
   determining a priority order of the protocol data units (PDU) to be served for data transmission on a communication channel, serving the protocol data units (PDU) by dynamically creating transport block sets (TBS) to be transmitted to the physical layer (PHY-layer) with regard to the defined priority order and dependent upon allocated radio resource constraints,
   the method further comprising linking two schedulers which operate, respectively, on an upper and a lower protocol layer, wherein each protocol data unit (PDU) of an incoming data flow to be transmitted is scheduled by the scheduler (PDU-scheduler) on the upper layer regarding pre-definable associated quality of service requirements into a priority list to be served by the scheduler (MAC-scheduler) of the lower layer,
   and medium access control is performed by the scheduler (MAC-scheduler) of the lower layer thereby optimizing the system efficiency of data transmission by dynamically operating on the protocol data units (PDU) within the priority list.

2. Method of claim 1, wherein the serving of the protocol data units (PDU) is performed periodically within scheduling intervals and depends on bandwidth, timing and/or power constraints.

3. Method of claim 1, comprising the adjusting of the transmission power required for a user equipment.

4. Method of claim 1, comprising an adjusting of the transmission power is comprising an initial adjustment step using predefined bit-error-rate requirements and an interference to pathloss rate estimation.

5. Method of claim 4, wherein the adjusting of the transmission power comprises a subsequent momentary adjustment step using the respective previous transmission power and data rate $(R_B)$.

6. Method of claim 1, wherein an overall transmission power $(P_{limit})$ of all active data flows is dynamically adjusted for a cell within a limit predefined by an allocated transmission power $(P_{ps})$.

7. Method of claim 1, comprising adjusting the bit error rate (BER) of the communication channel below a maximum bit error rate.

8. Method of claim 1, comprising ensuring a minimum data transmission rate $(R_{Bmin})$ and/or a maximum data transmission rate $(R_{bmax})$ for a user equipment.

9. Method of claim 1, comprising adjusting a transport format set depending on whether a real time service or a non real time service is requested.

10. Method of claim 1, wherein a single protocol data unit (PDU) is spread over several scheduling intervals.

11. Method of claim 1, comprising scheduling data flows on a downlink shared channel of a UMTS-System.

12. Method of claim 1, comprising scheduling data flows for different users on a dedicated channel in the downlink direction of a UMTS-System.

13. Method of claim 1, comprising scheduling data flows for a single user in an uplink direction of a UMTS-System.

14. CDMA system, especially a mobile telecommunication system comprising a transceiver unit having means for providing a priority order of protocol data units (PDU) of multiple data flows with regard to a predefined flow's quality of service requirements and for dynamically scheduling the ordered protocol data units (PDU) dependent upon allocated radio resource constraints,
   the CDMA system further comprising at least two schedulers each operating on different protocol layers, wherein a scheduler (PDU-scheduler) operating on an upper layer schedules each protocol data unit (PDU) of an incoming data flow to be transmitted into a priority list to be served by a scheduler (MAC-scheduler) of a lower layer, and the scheduler (MAC-scheduler) of the lower layer performs medium access control thereby optimizing the system efficiency of data transmission by dynamically operating on the protocol data units (PDU) within the priority list.

15. System of claim 14 comprising scheduling means for adjusting the transmission power required for a user equipment.

16. System of claim 14 comprising scheduling means for adjusting the transmission power subsequent to the establishment of a communication channel by using the respective previous transmission power and data rate ($R_B$).

17. System of claim 14 comprising scheduling means for monitoring the throughput without retransmissions and to compare said throughput with a virtual bandwidth depending on an allocated transmission power ($P_{ps}$) for adjusting an overall transmission power ($P_{limit}$) within a limit predefined by said allocated transmission power ($P_{ps}$).

18. System of claim 14 comprising scheduling means for ensuring a minimum data transmission rate ($R_{Bmin}$) and/or a maximum data transmission rate ($R_{bmax}$) for a user equipment.

19. System of claim 14 comprising the scheduler (PDU-scheduler) of the upper layer is operating with timestamps assigning every protocol data unit (PDU) or every data flow.

20. System of claim 14 comprising two linked schedulers operating on the Logical-Link-Control-layer and on the Medium-Access-Control-Layer, respectively.

21. System of claim 14 comprising a UMTS-system.

22. Base transceiver station comprising a transceiver unit for using in a system of claim 14.

23. Mobile station comprising a transceiver unit for using in a system of claim 14.

* * * * *